(12) United States Patent
Kim et al.

(10) Patent No.: US 12,679,662 B2
(45) Date of Patent: Jul. 14, 2026

(54) ACTIVATION TRAY CONGESTION MONITORING SYSTEM

(71) Applicant: LG ENERGY SOLUTION, LTD.,
Seoul (KR)

(72) Inventors: Tae Sung Kim, Daejeon (KR); Yoon Jong Oh, Daejeon (KR); Ji Hye Jung, Daejeon (KR); Woong Gun Oh, Daejeon (KR); Sang Uk Yeo, Daejeon (KR)

(73) Assignee: LG ENERGY SOLUTION, LTD.,
Seoul (KR)

( * ) Notice: Subject to any disclaimer, the term of this patent is extended or adjusted under 35 U.S.C. 154(b) by 627 days.

(21) Appl. No.: 18/031,558

(22) PCT Filed: Jul. 15, 2022

(86) PCT No.: PCT/KR2022/010363
§ 371 (c)(1),
(2) Date: Apr. 12, 2023

(87) PCT Pub. No.: WO2023/003287
PCT Pub. Date: Jan. 26, 2023

(65) Prior Publication Data
US 2023/0416010 A1 Dec. 28, 2023

(30) Foreign Application Priority Data
Jul. 19, 2021 (KR) ........................ 10-2021-0094357

(51) Int. Cl.
B65G 43/08 (2006.01)

(52) U.S. Cl.
CPC ...... B65G 43/08 (2013.01); *B65G 2201/0258* (2013.01); *B65G 2203/0233* (2013.01); *B65G 2203/042* (2013.01)

(58) Field of Classification Search
CPC .............................. B65G 43/08; B65G 37/00; B65G 2201/0258; B65G 2203/0233;
(Continued)

(56) References Cited

U.S. PATENT DOCUMENTS

2004/0155626 A1 8/2004 Hedegor et al.
2014/0084869 A1 3/2014 Ryu et al.
(Continued)

FOREIGN PATENT DOCUMENTS

| CN | 108069238 | A | | 5/2018 | |
| CN | 110809554 | A | * | 2/2020 | ............. B65G 21/22 |

(Continued)

OTHER PUBLICATIONS

Japanese Notice of Allowance for Japanese Application No. 2023-522394, dated Jun. 4, 2024, with an English translation.
(Continued)

*Primary Examiner* — Mong-Shune Chung
(74) *Attorney, Agent, or Firm* — Birch, Stewart, Kolasch & Birch, LLP

(57) ABSTRACT

An activation tray congestion monitoring system includes a tray transfer line for transferring a plurality of activation trays to an activation process and a subsequent process. A plurality of battery cells are accommodated in each of the plurality of activation trays, a master tray disposed between the plurality of activation trays and transferred along the tray transfer line, together with the activation trays, a position sensor included in the master tray and configured to detect a position of the master tray and transmit position data of the master tray, and a control unit configured to receive position data from the position sensor and monitor a position of the master tray in real time to identify a congestion section for each of the activation trays.

17 Claims, 5 Drawing Sheets

(58) Field of Classification Search

CPC .......... B65G 2203/042; H01M 50/204; H01M 50/20; H01M 10/0404; H01M 10/48; G08B 21/18

See application file for complete search history.

(56) References Cited

U.S. PATENT DOCUMENTS

| | | | |
|---|---|---|---|
| 2019/0044176 A1 | 2/2019 | Zhou et al. | |
| 2019/0064785 A1* | 2/2019 | Wurman | .............. G06Q 10/087 |
| 2021/0198041 A1* | 7/2021 | Austrheim | ........... B65G 1/0492 |
| 2022/0127079 A1* | 4/2022 | Hagiwara | ......... H01L 21/67727 |

FOREIGN PATENT DOCUMENTS

| | | | | | |
|---|---|---|---|---|---|
| CN | 212975913 | U | * | 4/2021 | |
| JP | 1-271313 | A | | 10/1989 | |
| JP | 11-40185 | A | | 2/1999 | |
| JP | H1140185 | A | * | 2/1999 | |
| JP | 2018-56548 | A | | 4/2018 | |
| JP | 2019-132785 | A | | 8/2019 | |
| JP | 2020-27095 | A | | 2/2020 | |
| JP | 2020111430 | A | * | 7/2020 | ........... B65G 1/1373 |
| JP | 2020-524645 | A | | 8/2020 | |
| JP | 6740330 | B2 | | 8/2020 | |
| JP | WO2019/064726 | A1 | | 9/2020 | |
| KR | 10-1032418 | B1 | | 5/2011 | |
| KR | 10-2013-0107565 | A | | 10/2013 | |
| KR | 101837312 | B1 | * | 4/2018 | ............. B64F 1/368 |
| KR | 10-1882611 | B1 | | 7/2018 | |
| KR | 10-2020-0030818 | A | | 3/2020 | |
| KR | 10-2216872 | B1 | | 2/2021 | |
| KR | 10-2277623 | B1 | | 7/2021 | |

OTHER PUBLICATIONS

International Search Report for PCT/KR2022/010363 mailed on Nov. 2, 2022.
Extended European Search Report for European Application No. 22846157.0, dated Nov. 5, 2024.

* cited by examiner

[FIG. 1]
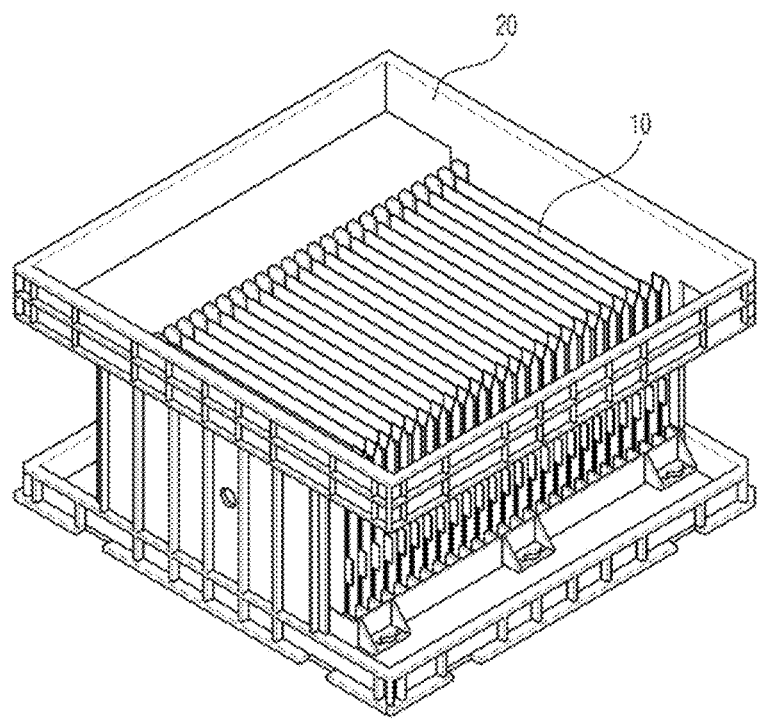
[FIG. 2]
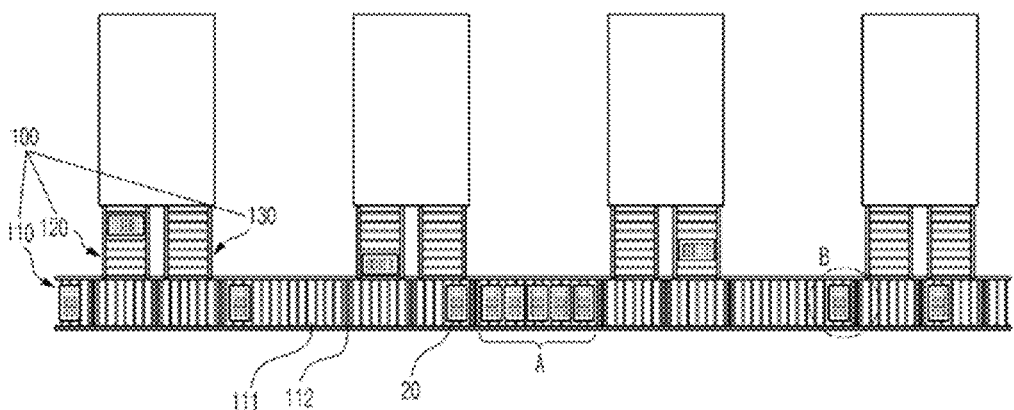

[FIG. 3]
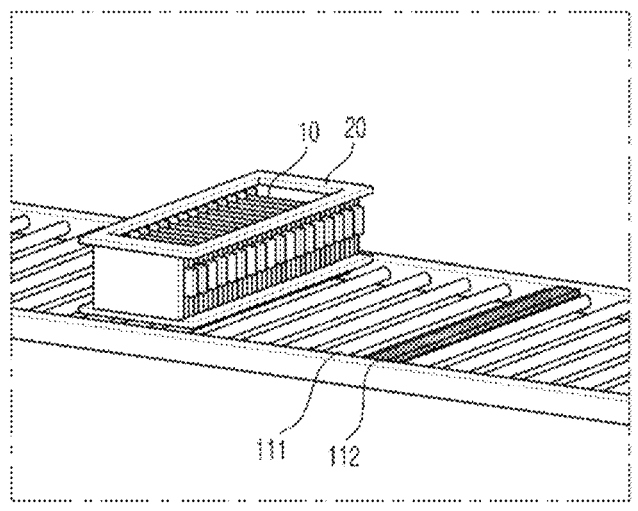
[FIG. 4]
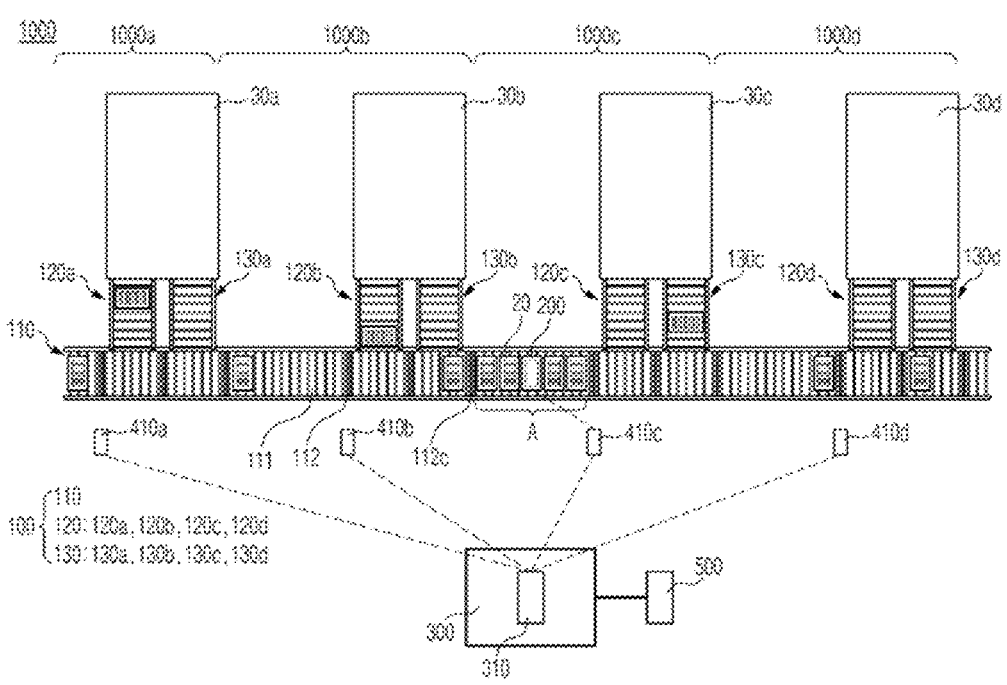

[FIG. 5]
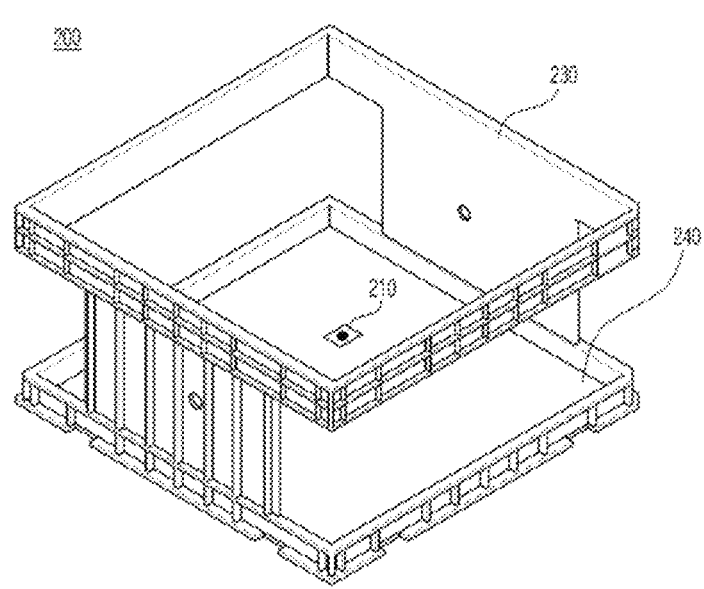

[FIG. 6]
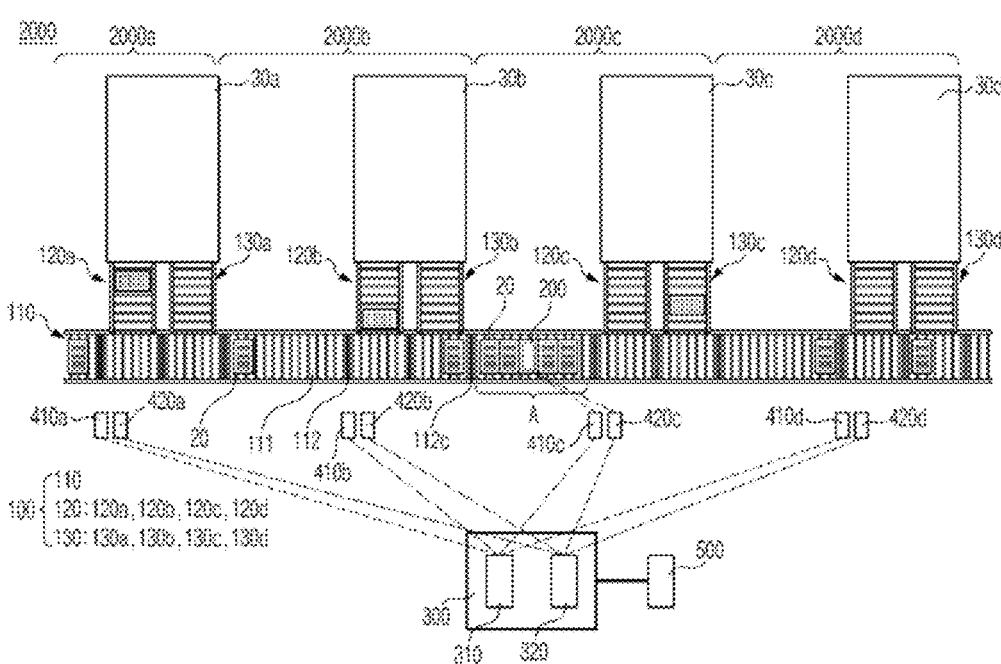

[FIG. 7]
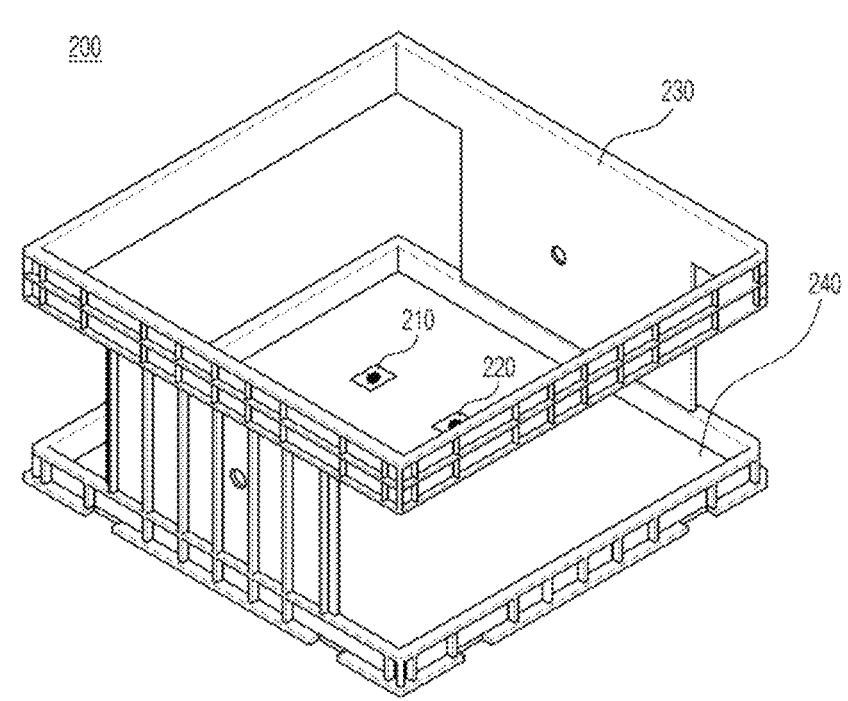

ACTIVATION TRAY CONGESTION MONITORING SYSTEM

TECHNICAL FIELD

The present disclosure relates to an activation tray congestion monitoring system.

More specifically, the present disclosure relates to an activation tray congestion monitoring system for identifying in real time a congestion section of each of a plurality of activation trays, in which a plurality of battery cells are accommodated, on a tray transfer line for transferring the plurality of activation trays to an activation process and a subsequent process.

This application claims the benefit of priority based on Korean Patent Application No. 10-2021-0094357, filed on Jul. 19, 2021, and the entire contents of the Korean patent application are incorporated herein by reference.

BACKGROUND ART

In general, secondary batteries are classified into a cylindrical battery, a prismatic battery, a pouch type battery, etc. according to a shape or are classified into a lithium ion battery, a lithium ion polymer battery, a lithium polymer battery, etc. according to the type of an electrolyte.

In recent years, the usage of pouch type batteries in which a stack or stack/foldable type electrode assembly is included in a pouch type battery case is gradually increasing owing to low manufacturing costs, low weight, ease of modification, etc.

To give battery cell characteristics to such a battery cell, an activation process and a subsequent process for product shipment are performed after a battery assembly process.

Specifically, a battery cell is manufactured by a process of preparing a primary battery cell in which an electrode assembly and electrolyte are included in a battery case, an aging process performed on the primary battery cell, and an activation process including sub-processes such as a process of charging/discharging the primary battery cell. Thereafter, the battery cell is shipped as a final product after subsequent processes, including a degassing process of removing gas generated in the aging process and the charging/discharging process and a characteristic measurement process of measuring various characteristics, e.g., a variation in an open circuit voltage (OCV) (voltage drop), internal battery resistance, etc. for shipping only high-quality products.

In this case, as shown in FIG. 1, an activation tray 20 in which a plurality of battery cells 10 are accommodated is moved by a moving unit such as a conveyer to perform sub-processes of the activation process and the subsequent processes.

FIGS. 2 and 3 show an example of a distribution system for transferring the cells 10, which are packaged by injecting an electrolyte into a battery case in which an electrode assembly is accommodated and sealing the battery case and accommodated in the activation tray 20, to an activation process and a subsequent process during a secondary battery manufacturing process of the related art.

As shown in FIG. 2, the activation tray 20 accommodating a plurality of battery cells is transferred along a main transfer line 110 of a tray transfer line 100, transferred to a branch transfer line 120 to be input to sub-processes, returned to the main transfer line 110 through a return transfer line 130 after the sub-processes are performed on the plurality of battery cells, and thereafter transferred to a subsequent process.

In this case, as shown in FIG. 3, a plurality of activation trays 20 are placed on a roller type conveyor configured by arranging a plurality of transfer rollers 111 spaced apart from each other and are transferred through the rotation of the transfer rollers 111 to perform the sub-processes.

A stopper 112 may be installed in one or more spaces between the transfer rollers 111 to control a logistical flow of activation trays, and configured to be moved up or down to above or under a transfer surface of the main transfer line 110 of the conveyor. The activation tray 20 is continuously transferred when the stopper 112 is located under the transfer surface, and is temporarily stopped when the stopper 112 is located above the transfer surface. Thus, the stopper 112 is moved up or down to control the transfer of the activation tray 20.

Generally, the stopper 112 is installed at a boundary between the main transfer line 110 and the branch transfer line 120 and a boundary between the return transfer line 130 and the main transfer line 110 to control the number of activation trays 20 to be input to the sub-processes.

However, as shown in FIG. 2, when congestion occurs in a certain section A due to various causes such as a malfunction of a stopper, an impact may be applied to battery cells in an activation tray due to a collision between the activation tray and the stopper or between activation trays, resulting in damage to the battery cells. When the congestion of the activation tray is not quickly resolved, collisions between activation trays may occur continuously, resulting in the accumulation of damage to the battery cells. In addition, the number of battery cells to be input to the sub-processes may be insufficient, thus adversely affecting a smooth manufacturing flow of the secondary battery.

Therefore, there is a need to develop a technique for monitoring in real time the transfer of activation trays to the activation process and the subsequent process to quickly detect and resolve congestion.

PATENT LITERATURE

Korean Patent Publication Laid-Open No. 10-2020-0030818

DISCLOSURE

Technical Problem

To address the above-described problems, the present disclosure is directed to providing an activation tray congestion monitoring system for checking in real time a congestion section of a tray transfer line for transferring a plurality of activation trays in which a plurality of battery cells are accommodated to an activation process and a subsequent process.

Technical Solution

An activation tray congestion monitoring system according to the present disclosure includes a tray transfer line configured to transfer a plurality of activation trays to an activation process and at least one subsequent process, wherein a plurality of battery cells are accommodated in each of the plurality of activation trays, a master tray disposed among the plurality of activation trays and configured to be transferred along the tray transfer line, together with the plurality of activation trays, a position sensor included in the master tray and configured to detect a position of the master tray and transmit position data of the master tray, and a control unit configured to receive the position data from the position sensor and identify a congestion section of the tray transfer line.

For example, the tray transfer line may include a main transfer line; branch transfer lines diverging from the main transfer line to the activation process and the at least one subsequent process; and return transfer lines configured to return to the main transfer line after the activation process and the at least one subsequent process are performed.

For example, the master tray may be a same as the plurality of activation trays, and battery cells may or may not be accommodated in the master tray.

For example, the position sensor may transmit the position data of the master tray for each predetermined interval of time or for each predetermined traveling distance.

As a specific example, the control unit may include a congestion determiner configured to determine whether the congestion section occurs for the plurality of activation trays on the basis of the position data.

For example, the congestion determiner may calculate a moving speed of the master tray on the basis of a change of the position data received by the control unit and an interval of time at which the change of the position data is received, and determine a certain section, including the master tray, of the tray transfer line as the congestion section when the moving speed is less than a set reference moving speed.

As another example, the congestion determiner may measure an interval of time at which the position data is received by the control unit, and determine a certain section, including the master tray, of the tray transfer line as the congestion section when the interval of time is more than a set reference interval of time.

For example, the activation tray congestion monitoring system may further include at least one position data transceiver provided on or adjacent to the tray transfer line and configured to receive the position data from the position sensor and transmit the position data to the control unit.

As a specific example, at least one position data transceiver may be installed for each of the main transfer line, branch transfer lines diverging from the main transfer line to the activation process and the at least one subsequent process, and return transfer lines configured to return to the main transfer line after the activation process and at least one subsequent process are performed.

For example, the position sensor may transmit the position data to the control unit through ultra-wideband short-range wireless communication.

As a specific example, the activation tray congestion monitoring system may further include an alarm configured to generate a warning when the congestion determiner determines that the congestion section occurs.

In this case, the alarm may be displayed on a control display screen of a facility monitoring control system (FMCS) that controls the transfer of tray logistics on the tray transfer line or displayed in the form of a text message on a portable terminal.

For example, an impact sensor configured to detect vibrations due to an impact applied to the master tray and transmit an impact data value may be installed in the master tray, and the control unit may receive the impact data value and monitor an abnormal impact occurrence section of the tray transfer line in real time.

As a specific example, the control unit may include an impact determiner configured to determine a certain section, including the master tray, of the tray transfer line as the abnormal impact occurrence section when the impact data value from the impact sensor exceeds a set reference value.

A position of the abnormal impact occurrence section may be specified in connection with the position data sensed by the position sensor.

As a specific example, the impact sensor may be integrally formed with the position sensor.

The activation tray congestion monitoring system may further include an alarm configured to generate a warning when the impact determiner determines that an abnormal impact occurrence section occurs.

Effects of the Invention

According to the present disclosure, position data transmitted from a position sensor included in a master tray can be received by a control unit to monitor a position of the master tray, thereby checking a congestion section of an activation tray in real time.

BRIEF DESCRIPTION OF THE DRAWINGS

FIG. 1 is a schematic perspective view of an activation tray of the related art.

FIG. 2 is a schematic plan view of an activation tray distribution system of the related art in which an activation tray is transferred to an activation process and a subsequent process.

FIG. 3 is a schematic perspective enlarged view of a part B of FIG. 2.

FIG. 4 is a schematic plan view of an activation tray congestion monitoring system according to an embodiment of the present disclosure.

FIG. 5 is a schematic perspective view of a master tray according to an embodiment of the present disclosure.

FIG. 6 is a schematic plan view of an activation tray congestion monitoring system according to another embodiment of the present disclosure.

FIG. 7 is a schematic perspective view of a master tray according to another embodiment of the present disclosure.

BEST MODE

Hereinafter, the present disclosure will be described in detail. First, the terms or expressions used in the present specification and claims should not be construed as being limited to ordinary or dictionary meanings, and should be construed in accordance with the meaning and concept consistent with the technical spirit of the present disclosure according to the principle in that inventors can properly define concepts of terms in order to describe their inventions in the best way.

It should be understood that the terms "comprise" and/or "comprising", when used herein, specify the presence of stated features, integers, steps, operations, elements, components, or a combination thereof, but do not preclude the presence or addition of one or more features, integers, steps, operations, elements, components, or a combination thereof.

It should be understood that when a component such as a layer, a film, a region, a plate or the like is referred to as being "on" another component, the component is "directly on" the other component or another component is interposed between these components. It should be understood that when a component such as a layer, a film, a region, a plate or the like is referred to as being "below" another component, the component is "directly below" the other component or another component is interposed between these components. In addition, it should be understood that when a component is "on" another component, the component is on or below the other component.

An activation tray congestion monitoring system according to the present disclosure includes a tray transfer line for transferring a plurality of activation trays, in which a plurality of battery cells are accommodated, to an activation process and a subsequent process, a master tray disposed between the plurality of activation trays and transferred along the tray transfer line, together with the activation trays, a position sensor included in the master tray and configured to detect a position of the master tray and transmit position data of the master tray, and a control unit configured to receive position data from the position sensor and monitor a position of the master tray in real time to identify a congestion section for each of the activation trays.

As described above, in the case of an activation tray distribution system of the related art, activation tray congestion due to various causes cannot be checked in real time, and thus, an impact may be applied to battery cells in each of the activation trays and a smooth flow of a secondary battery manufacturing process may be interfered with.

According to the present disclosure, a master tray including a position sensor that detects a position and transmits position data to a control unit to monitor the congestion occurring in activation tray logistics of the related art is disposed between a plurality of activation trays. Based on the position data transmitted to the control unit from the position sensor, the control unit may monitor in real time the congestion occurring in a certain section of a tray transfer line including the master tray.

The above-described components of the present disclosure will be described in more detail using the accompanying drawings and embodiments. In describing each drawing, similar reference numerals are used for similar elements. In the accompanying drawings, the dimensions of structures are exaggerated for clarity. Terms such as first and second may be used to describe various components but the components should not be limited by these terms. The terms are only used to distinguish one component from another. For example, a first component may be referred to as a second component without departing from the scope of the present disclosure, and similarly, a second component may also be referred to as a first component. As used herein, the singular expressions are intended to include plural forms as well, unless the context clearly dictates otherwise.

DETAILED DESCRIPTION OF THE PREFERRED EMBODIMENTS

The present disclosure will be described in detail below.

First Embodiment

FIG. 4 is a schematic plan view of an activation tray congestion monitoring system according to an embodiment of the present disclosure. FIG. 5 is a schematic perspective view of a master tray according to an embodiment of the present disclosure.

Referring to FIG. 4, an activation tray congestion monitoring system 1000 according to the embodiment of the present disclosure includes a tray transfer line 100 for transferring a plurality of activation trays 20 in which a plurality of battery cells 10 are accommodated to an activation process and a subsequent process, a master tray 200 disposed between the plurality of activation trays 20 and transferred along the tray transfer line 100, together with the activation trays 20, a position sensor 210 included in the master tray 200 and configured to detect a position of the master tray 200 and transmit position data, and a control unit 300 configured to receive position data from the position sensor 210 and monitor a position of the master tray 200 in real time to identify a congestion section for each of the activation trays 20.

The activation tray congestion monitoring system 1000 according to the present disclosure includes a tray transfer line 100 for transferring the plurality of activation trays 20 in which a plurality of battery cells are accommodated to an activation process and a subsequent process.

The activation tray 20 is a transfer unit for transferring a battery cell, which is packaged by injecting an electrolyte into a battery case in which an electrode assembly is accommodated and sealing the battery case, to the activation process. The activation tray 20 has a structure in which slots are formed in a direction of a width of battery cells to accommodate battery cells, and the battery cells are transferred to sub-processes while being accommodated in the activation trays 20 to perform processes such as charging/discharging and aging on the battery cells.

The tray transfer line 100 includes a main transfer line 110 for transferring the activation trays 20, a branch transfer line 120 diverging from the main transfer line 110 to perform sub-processes of the activation process and the subsequent process, and a return transfer line 130 for returning the activation trays 20 to the main transfer line 110 after the sub-processes are performed.

The tray transfer line 100 is not particularly limited provided that it is a transfer unit capable of transferring the activation tray 20 and the master tray 200. As a specific example, the tray transfer line 100 may be a conveyor for continuously transferring and providing trays to be applied to a serial production line, and the conveyor may be a belt-type conveyor or a roller-type conveyor. For example, as shown in FIGS. 3 and 4, the tray transfer line 100 may be a roller-type conveyor for transferring the activation tray 20 and the master tray 200 that are placed on a transfer roller 111 as the transfer roller 111 rotates.

The sub-processes of the activation process may include a charging/discharging process 1000a and an aging process 1000b, and the sub-processes of the subsequent process may include a degassing process 1000c and a characteristic measurement process 1000d. Accordingly, the tray transfer line 100 includes the main transfer line 110, the branch transfer line 120 diverging from the main transfer line 110 to the sub-processes, and a return transfer line 130 that returns to the main transfer line 110 after the sub-processes are performed. For example, the tray transfer line 100 includes a first branch transfer line 120a, a second branch transfer line 120b, a third branch transfer line 120c, and a fourth branch transfer line 120d that respectively diverge at a charging/discharging device 30a performing the charging/discharging process 1000a, an aging device 30b performing the aging process 1000b, a degassing device 30c performing the degassing process 1000c, and a characteristic measurement device 30d performing the characteristic measurement process 1000d, a first return transfer line 130a that returns to the main transfer line 110 after charging/discharging is performed by the charging/discharging device 30a, a second return transfer line 130b that returns to the main transfer line 110 after aging is performed by the aging device 30b, a third return transfer line 130c that returns to the main transfer line 110 after degassing is performed by the degassing device 30c, and a fourth return transfer line 30d that returns to the main transfer line 110 after characteristic measurement is performed by the characteristic measurement device 30d. In this case, the number, order, and types of processes may vary according to characteristics of a battery cell to be manufactured and are not particularly limited.

Here, in the activation tray congestion monitoring system 1000 of the present disclosure, the master tray 200 is disposed between the plurality of activation trays 20 and is transferred along the tray transfer line 100, together with the activation trays 20.

As shown in FIG. 4, a stopper 112 is installed in spaces between transfer rollers 111 at a boundary between the main transfer line 110 and each of the branch transfer lines 120a, 120b, 120c, and 120d and a boundary between each of the return transfer lines 130a, 130b, 130c, and 130d and the main transfer line 110. As shown in FIG. 3, the stopper 112 is configured to be moved up or down to above or under a transfer surface of the main transfer line 110, and controls the transfer of a tray such that the tray is continuously transferred when the stopper 112 is located under the transfer surface and is temporarily stopped when the stopper 112 is located above the transfer surface.

The present disclosure includes the master tray 200 disposed between the plurality of activation trays 20 and transferred along the tray transfer line 100 together with the activation trays 20. As described below, the master tray 200 is provided with a position sensor to transmit position data to a control unit, so that the control unit may check the flow of distribution of the activation trays 20 or identify whether there is congestion of the activation trays 20. That is, a master tray transmits, to a control unit, position data thereof as a criterion for determining whether not only the master tray becomes stagnant but also an activation tray disposed in a distribution section including the master tray or disposed before or after the master tray becomes stagnant. Therefore, it is preferable that the type of the master tray 200 be the same as the activation tray 20 of FIG. 1 as shown in FIG. 5. A transfer state of the activation tray 20 may be more accurately inferred and detected when a type (specifications such as a shape, standard, weight, etc.) of the master tray 200 is the same as that of the activation tray 20. Specifically, the master tray 200 may reflect a moving speed of the activation tray 20 according to a moving speed of the tray transfer line 100, and reflect an impact applied to the activation tray 20 due to a congestion section or an external impact as will be described below. In the master tray 200, battery cells may or may not be accommodated as in the activation tray 20. In the former case, the master tray 200 may be used to monitor the congestion of the activation tray 20 or an impact applied to the activation tray 20 while performing sub-processes as the activation tray 20. When battery cells are not accommodated as in the latter case, only a tray body is moved and thus a position sensor and the like installed in the master tray 200 may detect a position, impact, etc. more sensitively. However, in this case, because battery cells are not accommodated, additional equipment may be necessary to identify the master tray 200 by a barcode or the like and pass the master tray 200 without performing sub-processes on the master tray 200 in devices performing the sub-processes, when the master tray 200 is put into the sub-processes.

The master tray 200 includes the position sensor 210 for detecting a position of the master tray 200 and transmitting position data of the master tray 200 (see FIG. 5).

The position sensor 210 transmits position data so as to check whether there is congestion in a certain section A including the master tray 200. The position sensor 210 may be installed on, for example, a frame of or a bottom surface of the master tray 200, and particularly, on an inner wall 230 or an inner bottom surface 240. A position at which the position sensor 210 is installed is not particularly limited provided that a position of the master tray 200 can be detected more accurately and the position sensor 210 is located inside a tray in which there is not an obstacle interfering with data transmission. However, it is preferable that the position sensor 210 be installed firmly so as not to be separated from a tray even when impacts such as vibration occurs during movement. For example, the position sensor 210 may be installed on the inner bottom surface 240 of the master tray 200 to prevent the position sensor 210 from dropping even when the master tray 200 is separated from the tray transfer line 100 due to an impact applied to the master tray 200.

The position sensor 210 may transmit the coordinates of a predetermined point on the tray transfer line 100 to the control unit 300 when the master tray 200 passes the predetermined point. A method employed by the position sensor 210 to identify the coordinates of the predetermined point may be a radio-frequency identification (RFID) method in which the coordinates of a point are identified according to a response of a radio wave output from a reader included in the position sensor 210 to a tag on the tray transfer line 100. Alternatively, a barcode method in which visible light or an infrared ray is output from the reader and the coordinates of a point are identified according to a response of the visible light or the infrared ray to the tag on the tray transfer line 100 may be used. The tag may be installed on or adjacent to the tray transfer line 100.

In addition to the RFID method and the barcode method, the position sensor 210 may be a laser sensor, an ultrasound sensor, or a short-distance measurement sensor similar to the laser sensor or the ultrasound sensor. For example, when an ultrasound wave is output toward the control unit 300, the control unit 300 may obtain position data by measuring a distance on the basis of the time taken for the ultrasound wave to reach the control unit 300 by the position sensor 210.

The position sensor 210 may transmit position data of the master tray 200 to the control unit 300 at a certain interval of time or for each certain traveling distance.

The control unit 300 receives position data transmitted from the position sensor 210 and monitors a position of the master tray 200 in real time on the basis of the position data to identify a congestion section of an activation tray.

In the present embodiment, the control unit 300 includes a congestion determination unit 310 to determine whether there is a congestion section of the activation tray on the basis of the position data.

The congestion determination unit 310 may calculate a moving speed of the master tray 200 on the basis of a change of position data received by the control unit 300 and a certain interval of time at which position data is received, and determine a certain section A, including the master tray 200, of the tray transfer line 100 as a congestion section when the moving speed is less than a set reference moving speed. In this case, the interval of time may be in the range of $10^{-3}$ to 10 seconds but is not limited thereto.

More specifically, when the position sensor 210 transmits position data to the control unit 300 at a certain interval of time, the congestion determination unit 310 may calculate a moving speed of the master tray 210 on the basis of a change of the position data received by the control unit 300 and an interval of time at which position data is received, and determines the section A, including the master tray 200, of the tray transfer line 100 as a congestion section of the activation tray 20 when the moving speed is less than a set reference moving speed. For example, when the interval of time is 1 second and the change of the position data is 1 m, the moving speed of the master tray 200 is calculated to be 1 m/s and compared with the set reference moving speed. The reference moving speed may be set to an average moving speed of the tray transfer line 100, and the average moving speed of the tray transfer line 100 may be an average of moving speeds of the master tray 200 when there is no congestion.

Alternatively, the congestion determination unit 310 may measure an interval of time at which the position data is received by the control unit 300, and determine the section A, including the master tray 200, of the tray transfer line 100 as a congestion section of the activation tray 200 when the interval of time is more than a set reference interval of time.

More specifically, when the position sensor 210 transmits position data to the control unit 300 for each certain traveling distance, the control unit determination unit 310 measures an interval of time at which the position data is received by the control unit 300, and determines the section A, including the master tray 210, of the tray transfer line 100 as a congestion section of the activation tray 20 when the interval of time is more than a set reference interval of time. For example, the position sensor 210 transmits position data every 1 m, and the control unit 300 compares an interval of time at which the position data is received by the control unit 300 with a set reference interval of time. The reference interval of time may be set in consideration of an average moving speed of the tray transfer line 100, and may be set to 1 second when the average moving speed of the tray transfer line 100 is 1 m/s. That is, when the interval of time at which position data is received by the control unit 300 exceeds 1 second, the section A, including the master tray 200, of the tray transfer line 100 may be determined as a congestion section.

In this case, the section A, including the master tray 200, which is a unit for determining whether congestion occurs, may be set to an appropriate range according to the types of sub-processes and the number of activation trays and master trays to be transferred. For example, the section A may be set to an average number of activation trays put into each of the charging/discharging process 1000a, the aging process 1000b, the degassing process 1000c, and the characteristic measurement process 1000d. For example, when the number of activation trays to be put at one time in each process is set to 6, one master tray 200 and five activation trays 20 may be set as a unit of the section A including the master tray 200 as shown in FIG. 4. Accordingly, a congestion section may be checked for each of the above-described processes. Alternatively, a section including one or more activation trays 20 before and after the master tray 200 may be set to the section A, and the number of activation trays 20, which is a criterion for a congestion section, may be determined in various ways, in consideration of a length of a transfer line, characteristics of a process, etc.

Data may be transmitted from the position sensor 210 to the control unit 300 through wired or wireless communication, and may be transmitted directly to the control unit 300 when wired communication is used. However, it is preferable to transmit data wirelessly when a control unit is a factory automation system and a limitation of an installation space of the facility is taken into account. In wireless data transmission, communication may be established directly from the position sensor 210 to the control unit 300 as long as the specifications of the system permit. However, it may be necessary to install a data transceiver 410 for relaying data communication between the position sensor 210 and the control unit 300 when data transmission and reception efficiency is considered.

Specifically, position data transceivers 410a, 410b, 410c, and 410d may be further provided on or adjacent to the tray transfer line 100 to receive position data from the position sensor 210 and transmit the position data to the control unit 300. The position data transceivers 410a, 410b, 410c, and 410d may connect the position sensor 210 and the control unit 300 without being limited by a length or path of the tray transfer line 100 in the activation process and the subsequent process. Accordingly, data may be transmitted and received without limitation regardless of communication blind spots of the tray transfer line and the like. For example, when at least one of the position data transceivers 410a, 410b, 410c, and 410d is installed for each of the main transfer line 110, the branch transfer lines 120a, 120b, 120c, and 120d, and the return transfer lines 130a, 130b, 130c, and 130d, tray congestion may be monitored in almost an entire region of the tray transfer line 100. In this case, even when a direction of transfer is changed, the control unit 300 may receive position data of the master tray 200 smoothly without interfering with reception of the position data in all transfer lines.

Meanwhile, the position sensor 210 may transmit the position data of the master tray 200 to the control unit 300 through ultra-wideband (UWB) short-range wireless communication. UWB short-range wireless communication refers to a system that occupies an occupied bandwidth of 20% or more of a central frequency or wireless transmission technology for occupying an occupied bandwidth of 500 MHz or more. Because there is a relatively low spectrum power density over a very large frequency band, compared to an existing narrow band or broadband method, an existing wireless communication system is not disturbed and thus frequencies may be shared and used, thereby allowing accurate position data to be transmitted even in a secondary battery manufacturing process using various types of communication equipment. Unlike other wireless systems, communication is established at a baseband without using a carrier and thus a structure of a position sensor may be simplified, thereby manufacturing a position sensor at low costs.

As described above, in the activation tray congestion monitoring system 1000 of the present disclosure, the congestion or a congestion section of the activation tray 20 of the tray transfer line 100 may be identified in real time by the master tray 200, the position sensor 210, and the control unit 300.

In the present disclosure, a warning unit may be provided to issue a warning such as an alarm to a control system such as a factory automation system or an operator to resolve tray congestion, in addition to monitoring tray congestion. That is, as shown in FIG. 4, a warning unit 500 configured to generate a warning when the congestion determination unit 310 determines that a congestion section has occurred may be further provided. When the warning unit 500 is further provided, an administrator is able to easily identify a congestion section according to a warning generated by the warning unit 500 without continuously observing position data transmitted from the position sensor 210.

As a more specific example, a warning may be displayed on a control display screen of a facility monitoring control system (FMCS) that controls the transfer of tray logistics along the tray transfer line 100 or given in the form of a text message on a portable terminal. The FMCS is a system capable of controlling the transfer of tray logistics by setting or changing a tray transfer speed, whether to operate a stopper or not, the number of trays to be put into each sub-process, etc. on the control display screen. The FMCS may be used in conjunction with an existing FMCS to check whether there is congestion of an activation tray without additional equipment. The FMCS may be formed integrally with the control unit 300 or provided through separate equipment. When a warning is displayed in the form of a text message on a portable terminal, even when an administrator is not in a factory, congestion of an activation tray may be identified in real time, and the FMCS may be controlled at a remote place through a portable terminal or the congestion of the activation tray may be quickly handled by another administrator in the factory. For example, a stopper provided at a point on a corresponding process line to which a tray is to be input may be operated or the speed of a tray transfer line may be reduced.

Second Embodiment

FIG. 6 is a schematic plan view of an activation tray congestion monitoring system according to another embodiment of the present disclosure. FIG. 5 is a schematic perspective view of a master tray according to another embodiment of the present disclosure.

An activation tray congestion monitoring system 2000 of the present embodiment is different from the first embodiment in that an impact sensor 220 is installed to detect vibrations due to an impact applied to a master tray 200 and transmit impact data value. In the second embodiment, components that are the same as those of the first embodiment are assigned the same reference numerals and a detailed description thereof is omitted.

In the present embodiment, a control unit 300 may receive the impact data value and monitor an abnormal impact occurrence section of an activation tray 20 in real time. The impact sensor 220 may detect an impact applied to a tray due to various causes such as an external impact and impact caused by a collision between trays due to congestion.

Referring to FIG. 7, as described above, the master tray 200 may reflect the same result as an impact applied to the activation tray 20 when the master tray 200 is the same type as the activation tray 20.

An accelerometer that generates an electrical output when a mechanical impact or vibration is applied thereto may be used as an example of the impact sensor 220 but embodiments are not limited thereto. A piezoelectric accelerometer with a wide frequency range of about 0.5 Hz to 10 kHz, applicable to a variety of environments such as factories, and having a wide working area and a small volume may be used as a more specific example of the accelerometer. The impact data value transmitted from the impact sensor 220 may be a vibration value represented by a frequency but is not limited to the vibration value, and different types of data values may be transmitted according to a form of a sensing value (electrical data of a current and a voltage, physical data such as impact rate, etc.) of an impact measured by the applied impact sensor 220.

The impact sensor 220 may be provided on an inner wall 230 or an inner bottom surface 240 of the master tray 200, similar to the position sensor 210, and should be installed so as not to be separated due to movement during transfer. For example, the impact sensor 220 may be provided on the inner bottom surface 240 as illustrated in FIG. 7 to be stably provided even when an impact is applied to the master tray 200 or when the master tray 200 is separated from the tray transfer line 100. Alternatively, when the impact sensor 220 is disposed on the inner wall 230 of the master tray 200, an impact between trays or between a tray and a stopper can be detected more accurately.

In the present embodiment, as shown in FIG. 6, the control unit 300 includes an impact determination unit 320 to determine a certain section of the tray transfer line 100 including the master tray 200 as an abnormal impact occurrence section when the impact data value from the impact sensor 220 exceeds a set reference value.

The reference value may be a maximum value among impact data values measured by the impact sensor 220 when no impact is applied and weak vibration is applied to the master tray 200 due to transfer through the tray transfer line 100.

In this case, the section including the master tray 200, which is a unit for determining whether an abnormal impact occurs, may be determined by the types of sub-processes and the number of activation trays and master trays, similar to when a congestion occurrence section is determined. For example, the section may be set to an average number of activation trays put into each of the charging/discharging process 1000*a*, the aging process 1000*b*, the degassing process 1000*c*, and the characteristic measurement process 1000*d*. For example, when the number of activation trays to be input at one time in each process is set to 6, one master tray 200 and five activation trays 20 may be set as a unit of the section including the master tray 200 as illustrated in FIG. 4. Accordingly, an abnormal impact occurrence section may be checked for each of the above-described processes.

Data communication from the impact sensor 220 to the control unit 300 may be performed by wired or wireless communication, and a data transceiver 420 may be installed to relay data communication between the impact sensor 220 and the control unit 300, similar to data communication between the position sensor 210 and the control unit 300.

Specifically, as shown in FIG. 6, impact data transceivers 420*a*, 420*b*, 420*c*, and 420*d* may be further provided on or adjacent to the tray transfer line 100 to receive an impact data value from the impact sensor 220 and transmit the impact data value to the control unit 300. The impact data transceivers 420*a*, 420*b*, 420*c*, and 420*d* may connect the impact sensor 220 and the control unit 300 without being limited by a length or path of the tray transfer line 100 in the activation process and the subsequent process. For example, when at least one of the impact data transceivers 420*a*, 420*b*, 420*c*, and 420*d* is installed for each of the main transfer line 110, the branch transfer lines 120*a*, 120*b*, 120*c*, and 120*d*, and the return transfer lines 130*a*, 130*b*, 130*c*, and 130*d*, an abnormal impact occurrence section may be monitored in almost an entire region of the tray transfer line 100. In this case, even when a direction of transfer is changed, the control unit 300 may receive an impact data value of the master tray 200 smoothly without interfering with reception of position data in all transfer lines.

Meanwhile, a position of the abnormal impact occurrence section may also be specified by linking (matching) position data from the position sensor 210 installed in the master tray 200 and an impact data value from the impact sensor 220 when the impact data value is transmitted. That is, the position of each master tray 200 and an impact applied thereto may be monitored in real time in connection with each other by transmitting a set of the impact data value from the impact sensor 220 and the position data from the position sensor 210. Therefore, when one or both of the position and impact data of the master tray 200 are abnormal, the control unit 300 may detect and resolve the abnormality.

Although FIG. 7 illustrates that the impact sensor 220 and the position sensor 210 are separately installed in the master tray 200, the impact sensor 220 and the position sensor 210 may be integrally installed. For example, both an impact sensor and a position sensor may be installed in one sensor case and a common power supply may be installed in the sensor case. In this case, a sensor may be manufactured in a compact size and installed in the master tray 200 at one time, thereby simplifying the installation.

In addition, a warning unit 500 may be further provided to generate a warning when the impact determination unit 320 determines that an abnormal impact occurrence section occurs, similar to when the position determination unit 310 determines that a congestion section occurs. In this case, the warning unit 500 is as described above and thus a description thereof is omitted.

As described above, according to the present disclosure, whether an activation tray moving along a tray transfer line is stagnant can be identified in real time in an activation process and a subsequent process. According to another embodiment of the present disclosure, an impact applied to an activation tray or an abnormal impact occurrence section can be monitored, as well as identifying a congestion section.

Accordingly, whether there is a congestion and whether an impact is applied can be notified through a warning unit in connection with a distribution control system of a factory, thereby eliminating a cause of the congestion or the impact quickly.

The above description is only examples of the technical idea of the present disclosure and various modification and changes may be made by those of ordinary skill in the technical field to which the present disclosure pertains without departing from the essential features of the present disclosure. Therefore, the drawings of the present disclosure set forth herein are intended not to limit the technical idea of the present disclosure but to describe the technical idea, and the scope of the technical idea of the present disclosure is not limited by the drawings. The scope of protection for the present disclosure should be interpreted based on the following claims and all technical ideas within the same scope as the present disclosure should be interpreted as being included in the scope of the present disclosure.

In the present specification, terms representing directions such as upper, lower, left, right, forward and backward directions are used only for convenience of description and thus it will be obvious that these terms may be changed according to a position of an object or an observer.

REFERENCE NUMERALS

10: battery cell
20: activation tray
1000, 2000: activation tray congestion monitoring system
1000a, 2000a: charging/discharging process
1000b, 2000b: aging process
1000c, 2000c: degassing process
1000d, 2000d: characteristic measurement process
30a: charging/discharging device, 30b: aging device, 30c: degassing device, 30d: characteristic measurement device
100: tray transfer line
110: main transfer line
111: transfer roller
112: stopper
112c: stopper for controlling input to degassing process
120: branch transfer line 120a: first branch transfer line
120b: second branch transfer line
120c: third branch transfer line
120d: fourth branch transfer line
130: return transfer line
130a: first return transfer line
130b: second return transfer line
130c: third return transfer line
130d: fourth return transfer line
200: master tray
210: position sensor
220: impact sensor
230: inner wall
240: inner bottom surface
300: control unit
310: congestion determination unit
320: impact determination unit
410a, 410b, 410c, 410d: position data transceiver
420a, 420b, 420c, 420d: impact data transceiver
500: warning unit

The invention claimed is:

1. An activation tray congestion monitoring system comprising:
   a tray transfer line transferring a plurality of activation trays to an activation process and at least one subsequent process, wherein a plurality of battery cells are accommodated in each of the plurality of activation trays;
   a master tray disposed among the plurality of activation trays and transferred along the tray transfer line, together with the plurality of activation trays;
   a position sensor provided in the master tray and detecting a position of the master tray and transmitting position data of the master tray; and
   a control unit receiving the position data from the position sensor and identifying a congestion section for the tray transfer line.

2. The activation tray congestion monitoring system of claim 1, wherein the tray transfer line comprises:
   a main transfer line;
   branch transfer lines diverging from the main transfer line to the activation process and the at least one subsequent process; and
   return transfer lines returning to the main transfer line after the activation process and at least one subsequent process are performed.

3. The activation tray congestion monitoring system of claim 1, wherein the master tray is a same as the plurality of activation trays, and battery cells are accommodated or not accommodated in the master tray.

4. The activation tray congestion monitoring system of claim 1, wherein the position sensor transmits the position data of the master tray for each predetermined interval of time or for each predetermined traveling distance.

5. The activation tray congestion monitoring system of claim 4, wherein the control unit comprises a congestion determiner determining whether the congestion section occurs on the basis of the position data.

6. The activation tray congestion monitoring system of claim 5, wherein the congestion determiner calculates a moving speed of the master tray on the basis of a change of the position data received by the control unit and an interval of time at which the change of the position data is received, and determines a certain section, including the master tray, of the tray transfer line as the congestion section when the moving speed is less than a set reference moving speed.

7. The activation tray congestion monitoring system of claim 5, wherein the congestion determiner measures an interval of time at which the position data is received by the control unit, and determines a certain section, including the master tray, of the tray transfer line as the congestion section when the interval of time is more than a set reference interval of time.

8. The activation tray congestion monitoring system of claim 5, further comprising an alarm generating a warning when the congestion determiner determines that the congestion section occurs.

9. The activation tray congestion monitoring system of claim 8, wherein the alarm is displayed on a control display screen of a facility monitoring control system (FMCS) that controls transfer of tray logistics on the tray transfer line or is displayed in a form of a text message on a portable terminal.

10. The activation tray congestion monitoring system of claim 1, further comprising at least one position data transceiver provided on or adjacent to the tray transfer line and receiving the position data from the position sensor and transmitting the position data to the control unit.

11. The activation tray congestion monitoring system of claim 10, wherein at least one position data transceiver is installed for each of the main transfer line, branch transfer lines diverging from a main transfer line to the activation process and the at least one subsequent process, and return transfer lines returning to the main transfer line after the activation process and at least one subsequent process are performed.

12. The activation tray congestion monitoring system of claim 1, wherein the position sensor transmits the position data to the control unit through ultra-wideband short-range wireless communication.

13. The activation tray congestion monitoring system of claim 1, further comprising an impact sensor installed in the master tray and detecting vibrations due to an impact applied to the master tray and transmit an impact data value, wherein the control unit receives the impact data value and monitors an abnormal impact occurrence section of the tray transfer line in real time.

14. The activation tray congestion monitoring system of claim 13, wherein the control unit comprises an impact determiner determining a certain section, including the master tray, of the tray transfer line as the abnormal impact occurrence section when the impact data value from the impact sensor exceeds a set reference value.

15. The activation tray congestion monitoring system of claim 14, wherein a position of the abnormal impact occurrence section is specified in connection with the position data sensed by the position sensor.

16. The activation tray congestion monitoring system of claim 15, wherein the impact sensor is integrally installed with the position sensor.

17. The activation tray congestion monitoring system of claim 14, further comprising an alarm generating a warning when the impact determiner determines that an abnormal impact occurrence section occurs.

*    *    *    *    *